(12) United States Patent
Guidotti et al.

(10) Patent No.: US 9,316,793 B2
(45) Date of Patent: Apr. 19, 2016

(54) OBLIQUE ANGLE OPTICAL FIBER ASSEMBLY

(71) Applicant: National Center for Advanced Packaging Co., Ltd., Wuxi, Jiangsu (CN)

(72) Inventors: Daniel Guidotti, Atlanta, GA (US); Wenqi Zhang, Wuxi (CN); Haiyun Xue, Wuxi (CN)

(73) Assignee: National Center for Advanced Packaging Co., Ltd., Wuxi, Jiangsu (CN)

( * ) Notice: Subject to any disclaimer, the term of this patent is extended or adjusted under 35 U.S.C. 154(b) by 0 days.

(21) Appl. No.: 14/471,511

(22) Filed: Aug. 28, 2014

(65) Prior Publication Data
US 2015/0212277 A1 Jul. 30, 2015

(30) Foreign Application Priority Data

Jan. 27, 2014 (CN) .......................... 2014 1 0040038

(51) Int. Cl.
*G02B 6/26* (2006.01)
*G02B 6/36* (2006.01)
*G02B 6/30* (2006.01)
*G02B 6/34* (2006.01)

(52) U.S. Cl.
CPC ............ *G02B 6/3644* (2013.01); *G02B 6/3636* (2013.01); *G02B 6/30* (2013.01); *G02B 6/34* (2013.01); *Y10T 29/49826* (2015.01)

(58) Field of Classification Search
None
See application file for complete search history.

(56) References Cited

U.S. PATENT DOCUMENTS

| | | |
|---|---|---|
| 5,468,605 A | 11/1995 | Harris et al. |
| 6,577,803 B2 | 6/2003 | Matsumoto et al. |
| 6,704,483 B2 | 3/2004 | Sherman et al. |
| 7,060,624 B2 | 6/2006 | Andricacos et al. |
| 7,162,124 B1 | 1/2007 | Gunn, III et al. |
| 7,184,625 B2 | 2/2007 | Gunn, III et al. |
| 7,184,626 B1 | 2/2007 | Gunn, III et al. |
| 7,245,803 B2 | 7/2007 | Gunn, III et al. |
| 7,269,326 B2 | 9/2007 | Paddon et al. |
| 7,298,939 B1 | 11/2007 | Malendevich et al. |
| 7,702,191 B1 | 4/2010 | Geron et al. |
| 7,986,696 B1 | 7/2011 | Miliavisky et al. |
| 8,090,230 B1 | 1/2012 | Hasharoni et al. |
| 8,325,403 B1 | 12/2012 | Mesh et al. |

(Continued)

FOREIGN PATENT DOCUMENTS

| | | |
|---|---|---|
| CN | 1582405 A | 2/2005 |
| CN | 201410375104 | 10/2014 |
| JP | 2004061881 A | 2/2004 |

OTHER PUBLICATIONS

"Fiber Optic V-Grooves & Arrays", fiberguide industries, SPEC 721 002, Rev. Jun. 27, 2012 (pp. 1- 2).

(Continued)

*Primary Examiner* — Sung Pak
(74) *Attorney, Agent, or Firm* — Goodwin Procter LLP

(57) ABSTRACT

An optical fiber assembly and a method of assembly thereof. The optical fiber assembly includes a support plate defining an array of support plate through holes, and an alignment template plate defining an array of alignment template plate through holes. At least one support plate through hole or alignment template plate through hole may be flared. At least one support plate through hole or alignment template plate through hole may include a compliant film.

18 Claims, 7 Drawing Sheets

(56) References Cited

U.S. PATENT DOCUMENTS

| | | | |
|---|---|---|---|
| D675,996 S | 2/2013 | Geron et al. | |
| 8,392,487 B1 | 3/2013 | Mesh et al. | |
| 8,433,162 B2 | 4/2013 | Pinguet et al. | |
| 8,440,989 B2 | 5/2013 | Mack et al. | |
| 8,577,191 B2 | 11/2013 | De Dobbelaere et al. | |
| 2002/0131703 A1* | 9/2002 | Velikov | G02B 6/32 385/35 |
| 2002/0154882 A1* | 10/2002 | Moran | G02B 6/362 385/137 |
| 2004/0042732 A1* | 3/2004 | Bruns | G02B 6/3833 385/71 |
| 2011/0176765 A1* | 7/2011 | Lee | G02B 6/4202 385/14 |
| 2012/0106562 A1 | 5/2012 | Laor et al. | |
| 2012/0106898 A1 | 5/2012 | Geron et al. | |
| 2013/0195402 A1* | 8/2013 | Popp | G02B 6/322 385/26 |
| 2013/0301982 A1* | 11/2013 | Lee | G02B 6/4206 385/14 |
| 2014/0133487 A1 | 5/2014 | Margalit et al. | |
| 2014/0133493 A1 | 5/2014 | Miliavsky et al. | |
| 2014/0133851 A1 | 5/2014 | Zeltser et al. | |
| 2014/0133852 A1 | 5/2014 | Chairman et al. | |
| 2014/0161396 A1* | 6/2014 | Feng | G02B 6/4243 385/83 |
| 2014/0334773 A1* | 11/2014 | Mathai | G02B 6/4292 385/14 |

OTHER PUBLICATIONS

"Silicon Photonics and the Future of Core Routing", www.compass-eos.com, 6 pages, Mar. 2013.

"White Paper: 2D Arrays", fiberguide industries, SPEC 722 001, Rev. Dec. 18, 2013 (pp. 1-4).

Assefa et al., "A 90 nm CMOS Integrated Nano-Photonics Technology for 25 Gbps WDM Optical Communications Applications," IEEE International Electron Devices Meeting (IEDM), postdeadline session 33.8 (Dec. 10-12, 2012).

Can et al., "High Efficiency Grating Coupler for Coupling between Single-Mode Fiber and SOI Waveguides", Chin, Phys. Lett. vol. 30, No. 1 (2013) pp. 014207-1-014207-4.

Tan et al., "Surface Engineering and Patterning Using Parylene for Biological Applications", Materials 2010, 3, 1803-1832.

Tantawi et al., "Processing of photosensitive APEX™ glass structures with smooth and transparent sidewalls," Journal of Micromechanics and Microengineering, vol. 21, p. 017001 (2011).

Office Action in Chinese Application No. 201410040038.1 dated Aug. 20, 2015 (4 pages).

\* cited by examiner

Figure 2A
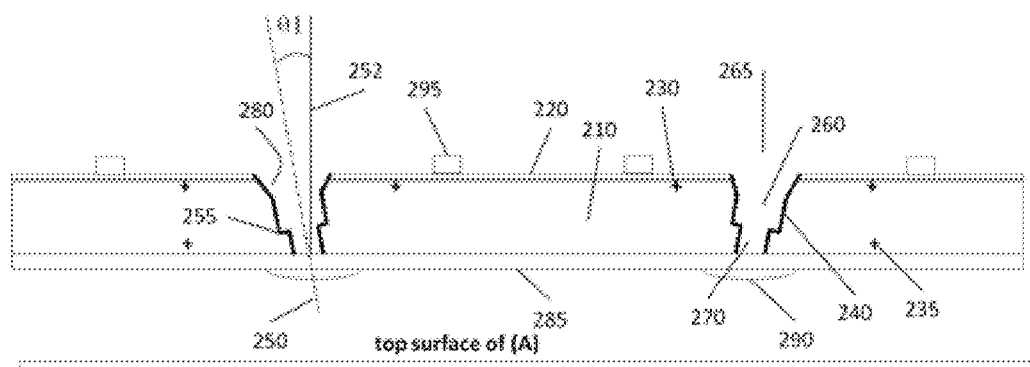
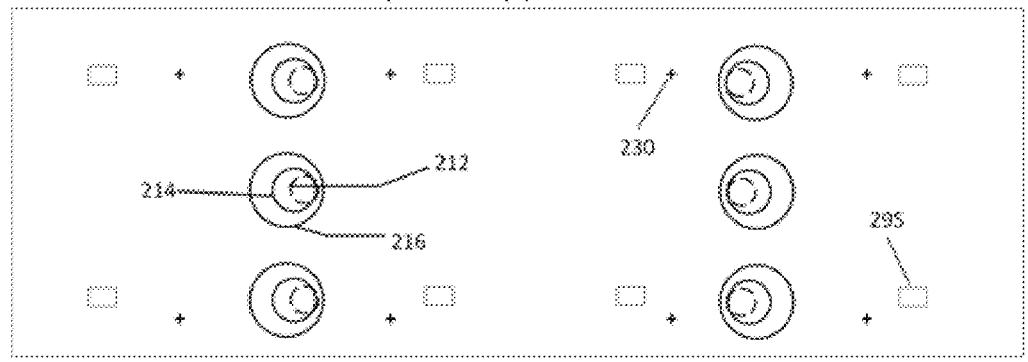
Figure 2B

OBLIQUE ANGLE OPTICAL FIBER ASSEMBLY

RELATED APPLICATION

This application claims the benefit of Chinese Application Serial No. 201410040038.1, filed Jan. 27, 2014, which is incorporated herein by reference in its entirety.

BACKGROUND

As used herein, "chip" or "die" refers to a semiconductor shape substantially comprising electrical circuits while "photonic chip" or "photonic die" refers to a semiconductor shape substantially comprising optical circuits.

As used herein, "photonic circuits" refers to the monolithic integration of active and passive optical circuits on a mostly silicon platform. Examples of passive optical circuit components include a silicon rectangular waveguide, an Echelle grating and multimode interference devices. Examples of active optical circuit components include Mach-Zehnder switches, Mach-Zehnder modulators and rectangular waveguide germanium photodetectors. Integrated photonic technology can bring technical advances to data communication and telecommunication. In the former, the communication bandwidth between processors can be enhanced over greater distances when transmitting optical bits rather than electrical charge bits. In the latter case, optical core routing can be more energy-efficient and cost-effective if conducted on an integrated silicon photonic circuit instead of being conducted in a cabinet of electronic switches, optical-to-electrical and electrical-to-optical converters. While many technical advances toward a photonic chip router have been recorded, effective ways to bring light onto a photonic chip and out again have been relegated to few optical channels in research settings.

To be economically and technically advantageous a photonic core router on a chip preferably has a sufficient number of precise and reliable optical input and output ports, a condition which is yet to be fulfilled.

SUMMARY

Some embodiments of the present invention include the design and means of construction for an optical fiber subassembly that enable light communication between optical fibers and photonic circuits, in particular by means of grating optical mode transformers.

Embodiments of the present invention relate to the input and output of light between a first set of optical fiber light guides having a first set of optical properties and a second set of silicon light guides having a second set of optical properties. The efficient transition of light between the two sets of light guides is affected by means of an optical mode transformer. While a mode transformer theoretically cannot be completely efficient, nevertheless loss can be reduced to acceptable levels by good design.

Embodiments of the present invention further relate to the input of light between a first set of light guides and a second set of light guides by means of a periodic and semi periodic structure that comprises the optical mode transformer.

In one aspect, embodiments of the present invention relate to the efficient exchange of light between a large number of single mode cylindrical optical fibers and a large number of single mode rectangular single mode silicon waveguides by means of the above-mentioned grating mode transformer. In yet another aspect, the present invention relates to the assembly and optical alignment of a large array of optical fibers to a large array of grating mode transformers consistent with precision mass manufacturing practices.

In an aspect, embodiments of the invention include an optical fiber assembly that includes a four-sided support plate comprising a first planar element defining an array of support plate through holes, each support plate through hole having a substantially constant diameter and ending at a top surface of the support plate. The support plate may have additional guiding holes and mounting threaded holes. Each support plate through hole has a principal symmetry axis defining an oblique angle with the top surface of the support plate. An alignment template plate is disposed parallel to the support plate with a top surface of the alignment template plate opposing a bottom surface of the support plate, the alignment template plate including a second planar element defining an array of alignment template plate through holes, each alignment template plate through hole having dual diameters and ending at a top surface of the alignment template plate. Each alignment template plate through hole has a symmetry axis defining an oblique angle with the top surface of the alignment template. The array of alignment template plate through holes is aligned with the array of support plate through holes such that the symmetry axis of each alignment template plate through hole coincides with the symmetry axis of a respective support plate through hole.

At least one support plate through hole and/or alignment template through hole is flared outwards.

One or more of the following features may be included. At least one support plate through hole may be flared outwards at the top surface of the support plate. At least one alignment template plate through hole may be flared outwards at the top surface of the alignment template plate.

At least one template plate through hole may include dual concentric diameters.

The bottom surface of the support plate may be parallel to the top surface of the alignment template plate.

Spacers may be disposed between the support plate and the alignment template plate. The spacers may include an insulating material.

Spacers may be disposed between the alignment template plate and a photonic circuit die. The spacers may include an insulating material.

An array of parallel optical fibers may extend through the support plate through holes and alignment template plate through holes and stop inside the alignment template plate through holes, each optical fiber having a longitudinal axis parallel to a respective support plate through hole array symmetry axis and alignment plate through hole array symmetry axis, through which the optical fiber extends. At least one template plate through hole may include dual concentric diameters and at least one optical fiber may terminate at a smaller concentric diameter of the at least one template through hole.

An optically transparent material may contact the bottom surface of the alignment template plate.

A lens array may be included, e.g., proximate a bottom surface of the alignment template plate. The lens array may be aligned with respect to the array of alignment template plate through holes.

A compliant film may be disposed on a wall of at least one support plate through hole and/or on a wall of at least one alignment template plate through hole.

A polymer may be disposed between the support plate and the alignment template plate.

At least one support plate hole, e.g., a support plate through hole, may be threaded.

At least one of the support plate and the alignment template plate may include four sides, e.g., define a parallelepiped.

The bottom surface of the support plate may be substantially parallel to the top surface of the alignment template plate.

In another aspect, embodiments of the invention include an optical fiber assembly including a support plate including a first planar element defining an array of support plate through holes, each support plate through hole having a constant diameter and ending at a top surface of the support plate, with each support through hole having a principal symmetry axis defining an oblique angle with the top surface of the support plate. Each through hole may have a flared opening. An alignment template plate is disposed parallel to the support plate with a top surface of the alignment template plate opposing a bottom surface of the support plate, the alignment template plate including a second planar element defining an array of alignment template plate through holes, each alignment template plate through hole having dual diameters and ending at a top surface of the alignment template plate. Each alignment plate through hole may have a flared opening at one surface. Each alignment template plate through hole has a symmetry axis defining an oblique angle with the top surface of the alignment template. The array of alignment template plate through holes is aligned with the support plate through holes such that the symmetry axis of each alignment template plate through hole coincides with the symmetry axis of the support plate through hole aligned with the respective template plate through hole. A compliant film is disposed on at least one support plate through hole and/or at least one alignment template plate through hole.

In still another aspect, embodiments of the invention include a method for assembling an optical fiber assembly. The method includes the steps of:
 a) providing a support plate defining an array of tilted and flared support plate through holes;
 b) aligning an alignment template plate with a bottom surface of the support plate, the alignment template plate defining an array of tilted and flared alignment template through holes, with at least one support plate through hole and/or alignment template through hole including a compliant film; and
 c) inserting a plurality of optical fibers into the arrays of support plate through holes and alignment template plate through holes.

BRIEF DESCRIPTION OF THE DRAWINGS

FIGS. 2A and 2B are cross-sectional and top views, respectively, of an alignment template plate having inclined, dual diameter holes, lenses and spacers in accordance with an embodiment of the invention.

DETAILED DESCRIPTION

Figures 1A, 1B:
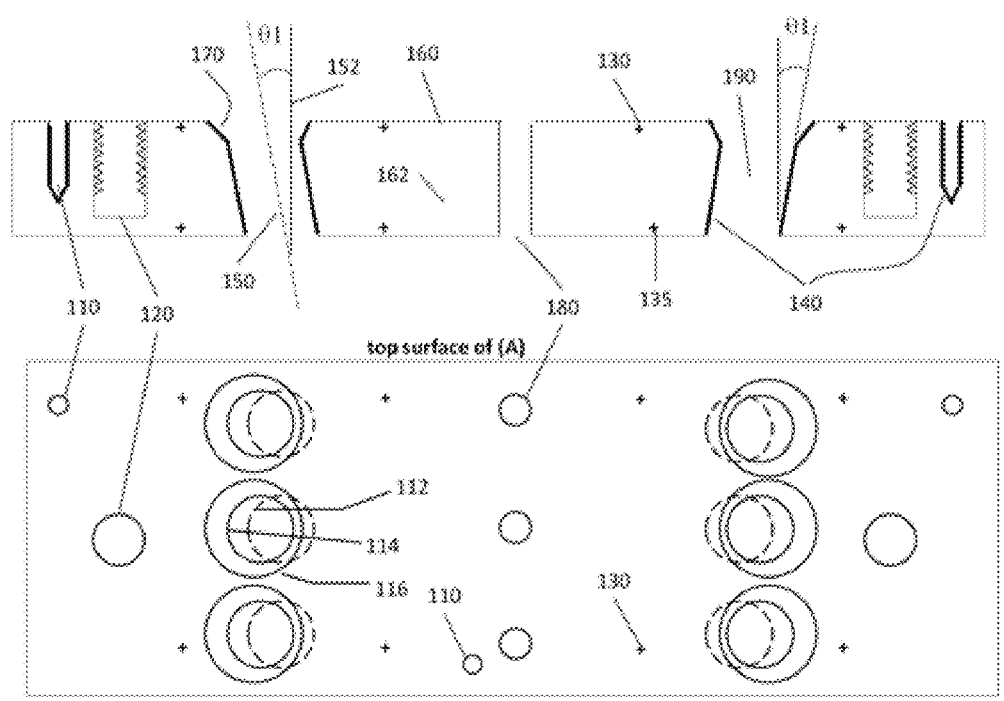
FIGS. 1A and 1B are cross-sectional and top views, respectively, of a support plate having inclined through holes for optical fiber alignment, pin guide holes, threaded holes, and straight through holes in accordance with an embodiment of the invention.

Chips that perform numerous photonic functions, for example, wavelength demultiplexing, switching, coding and optical to electrical conversion are being developed. For example, U.S. Pat. No. 8,440,989 issued May 14, 2013, entitled "Method and System for a Light Source Assembly Supporting Direct Coupling to an Integrated Circuit," Michael Mack, et al., discloses a number of broad concepts for introducing light into and extracting light out of integrated photonic circuit waveguides by means of intermediate integrated grating couplers. However, Mack, et al., do not disclose how to construct coupling structures that can be implemented on a large scale.

In their publication entitled "A 90 nm CMOS Integrated Nano-Photonics Technology for 25 Gbps WDM Optical Communications Applications," published in IEEE International Electron Devices Meeting (IEDM), postdeadline session 33.8, Dec. 10-12, 2012, Solomon Assefa, et al., discuss four integrated photonic circuit components: a silicon modulator that can be used in optical coding, a germanium photodetector that can be used for converting optical signals to electrical signals, an optical filter that can be used in wavelength division multiplexing, and a grating coupler that can be used to couple light to or from optical fibers. However, manufacturing means by which light is coupled in and out of the integrated photonic circuit are not disclosed.

The publication Zhang Can, et al., "High Efficiency Grating Coupler for Coupling between Single-Mode Fiber and SOI Waveguides," published in 2013 in *Chinese Physics Letters*, Volume 30, page 014207-1, incorporated herein by reference in its entirety, reports the design and construction of a grating coupler having high efficiency. Manufacturing means by which light is coupled in and out of the integrated photonic circuit are not disclosed.

The state of the art of silicon photonics has advanced into the art of active and passive photonic circuits capable of advancing computing and communications. However, no means exist by which to inject or extract light from the photonic circuit, which is scalable to mass production involving hundreds of optical fibers on a single photonic die.

The coupling structure in accordance with an embodiment of the invention is suitable for use in the exchange of light between arrays of single mode optical fibers and integrated photonic circuits by use of arrays of grating couplers somewhat similar to the grating couplers disclosed in U.S. Pat. No.

8,440,989 issued May 14, 2013. The optical fiber array coupler disclosed in U.S. Pat. No. 8,440,989, however, has limited fiber density because of the large mounting block used to hold the optical fibers. The optical fiber coupling assembly in accordance with embodiments of the present invention is scalable to large arrays of optical fibers in conjunction with a large array of integrated grating couplers.

To facilitate an understanding of the principles and features of various embodiments of the present invention, they are explained hereinafter with reference to their implementation in an illustrative embodiment. In particular, an illustrative embodiment of the invention is described in the context of an assembly of optical fibers suitable for the areal launching of light into an array of high permittivity waveguides, specifically by means of grating beam mode transformers. This embodiment is subject to the principle of time reversal invariance by which principle light emanating from the same array of high permittivity waveguides is launched into the same array of optical fibers by the same array of mode transformers. A second illustrative embodiment of the present invention is described in the context of being an optical fibers assembly suitable for channeling light form integrated photonic circuits into an array of optical fibers.

The materials and components described hereinafter as making up the various elements of the present invention are intended to be illustrative and not restrictive. Many suitable materials and components that would perform the same or a similar function as the materials and components described herein are intended to be embraced within the scope of the invention. Further, such other materials not described herein can include, but are not limited to, materials that are developed after the time of the development of the invention, for example.

Referring now to the figures, in which like reference numerals represent like parts throughout the view, embodiments of the present invention will be described in detail.

As used herein, "parallelepiped" means having four parallel sides.

FIG. 1A is a cross-sectional side view of a substantially parallelepiped support plate structure 162 having a top surface 160. FIG. 1B is a top view of the support plate structure 162. The function of the support plate is to mechanically support the completed assembly that includes an array of optical fibers, aligned and cemented to photonic circuit die 850 (see FIG. 9), to a housing that may be part of a communication or computing machine. For this purpose alignment holes 190 in support plate 162 are designed to give larger clearance to the optical fiber having a buffer 320 (see FIG. 4) than the clearance given to the bare optical fiber 340 by more precise bare fiber alignment holes 260 in precision alignment plate 210 (see FIGS. 2A and 2B).

Mechanical connection between completed assembly and housing may include guide holes 110 in conjunction with retaining threaded holes 120 formed in a metal support plate. Alternatively, mechanical connection between a completed assembly and a housing may include guide holes 110 in conjunction with an adhesion layer. In the latter case support plate material may be chosen from the broad categories of rigid materials, among which are metals, ceramics, glasses or silicon. Guide holes may be formed in a silicon support plate by micromachining practices well known to practitioners of the art of semiconductor processing. Guide holes in glass may be formed by mechanical grinding or by etching photo-definable glass as described, for example, in a published article by Khalid Hasan Tantawi, et al., entitled "Processing of photosensitive APEX™ glass structures with smooth and transparent sidewalls," which appears in the *Journal of Micromechanics and Microengineering*, Vol. 21, page 017001(2011) incorporated herein by reference in its entirety. Guide holes may be formed in ceramics by punching holes through a stack of ceramic green sheets, a practice that is familiar to those skilled in the art of ceramic processing.

Photonic circuit die 850 is preferably electrically connected to a circuit board and a measurable degree of flexibility is required between the housing and circuit board. The thickness of support plate 162 may be selected from a range of, e.g., 0.1 mm to 10 mm and the thickness of precision alignment template plate 210 may be selected from a range of 0.1 mm to 1 mm.

The support plate 162 defines an array of inclined, substantially cylindrical through holes 190 flared at one end 170 intersecting the top surface of the support plate 162. The flared end 170 of the through hole 190 facilitates the capture of an optical fiber.

Each of the cylindrical through holes 190 has a principal symmetry axis 150 inclined by angle $\theta 1$ with respect to a normal to the top surface 160, a substantially uniform through diameter and flared opening 170 at the top surface. The angle $\theta 1$ is determined in accordance with the design of a coupling grating on a photonic circuit layer discussed in conjunction with FIG. 8. In particular, the inclination angle $\theta 1$ is preferably selected from a range of 6 degrees to 15 degrees to maximize the coupling efficiency of the planar grating as determined from the theory, modeling and simulations of the structured features of the silicon grating grooves, and taking into account the substrate glass cladding of the grating and the essentially Gaussian beam energy distribution of the light emanating from a single mode optical fiber. See, for example Zhang Can, et al., "High Efficiency Grating Coupler for Coupling between Single-Mode Fiber and SOI Waveguides," *Chinese Physics Letters*, Volume 30 (2013) page 014207-1.

As an example of the number of optical fiber input and output ports that may be implemented over the area of a photonic circuit die, the area of the die may be substantially 20 mm by 20 mm, consistent with the dimensions of high performance multicore processor dies to date. The support plate 162 preferably has substantially similar or somewhat larger dimensions. Single mode telecommunication optical fibers typically have a 9 micrometer diameter glass core and a 125 micrometer diameter glass cladding, surrounded by a 250 micrometer outer diameter polymer buffer coating. Therefore, when support plate holes 190 have flare opening 170 of 300 micrometer diameter, the maximum number of single mode optical fibers that can fit in a 20 mm×20 mm support plate 162 on a pitch of 400 micrometers is approximately 2500. The distance between hole centers, or pitch, of 400 micrometers is used as an example to retain sufficient material between holes.

Support plate structure 162 also defines straight access holes 180, guide pin alignment holes 110, and threaded binding holes 120. The guide pin alignment holes 110 and cylindrical through holes 190 may have smooth sidewalls lined with a compliant film, e.g., a low friction polymer 140. Examples of suitable low friction polymer coatings are, e.g., polytetrafluoroethylene or a parylene polymer. The polymer coating may be deposited conformally, e.g., by chemical vapor deposition. Parylene polymer deposition may be performed at room temperature, while polytetrafluoroethylene coatings requires a cure cycle between 260° C. and 370° C. A thickness of the polymer coating may be selected from a range of, e.g., 0.25-0.75 microns, preferably 0.5 microns to provide a soft, slippery coating that facilitates the introduction of fibers without damage.

Guide pin alignment holes 110 may be used during the assembly process of the optical fiber assembly. Guide pins 315 (see FIG. 4) are integral to the V-groove block 310 that is used to hold the optical fibers in place as they are made to slide sequentially into alignment holes 190 in the support plate 162 and into through holes 265 in the precision alignment template plate 210. Referring also to FIG. 1A, alignment fiducials 130, 135 on the top and bottom surfaces of the support plate may be used to facilitate the alignment steps discussed below.

The support plate through holes, when the support plate material is silicon, may be defined by reactive ion etching, the inclination angle being defined by inclination of the sample within the chamber during the etching process taking into account projection ellipticity and compensating for same by pre-distortion of mask geometric features.

In FIG. 1B, an array of six inclined holes is represented in the top view of the parallelepiped support structure. Circle 112, dashed line, represents the diameter of a non-flared portion of through hole 190 at the bottom surface of the support plate structure, circle 114 represents the diameter of through hole 190 near the top surface of the support plate structure before flaring, and circle 116 represents the diameter of flared through hole 190 at the top surface. The center offset between circles 112 and 114 represents the offset attributable to tilt angle $\theta 1$ and thickness of the support plate 162. Exemplary suitable diameters of through hole 190 are between 126 micrometers and 136 micrometers, while flair opening 170 of hole 190 at surface 160 of support plate 162 may be about 300 micrometers in diameter.

FIG. 2A is a cross-sectional side view of a substantially parallelepiped precision alignment template plate 210. Alignment template plate 210 is the principal determinant of the precision alignment between the optical fiber array and the grating coupler array on the silicon photonics die. The alignment template plate may be made of a suitable material in which alignment holes may be formed with a high degree of reproducibility and high degree of precision of hole features and hole relative location. Silicon micromachining by reactive ion etching using the Bosch process, well known to those skilled in the art of silicon processing, is an exemplary choice of both material and processing control.

Precision alignment template plate 210 contains arrays of dual diameter through holes 265 with a first diameter 260 in a first portion and a second diameter 270 in a second portion of the through hole, with the through hole having a flared opening 280 at the top surface of the precision alignment template plate. The purpose of the smaller diameter is to stop the advancing optical fiber at a predetermined and consistent position, determined by the light spot size on the grating coupler. The two diameters provide a controlled stop 255 at a substantially consistent depth for optical fiber insertion. The flared end of the through hole 265 facilitates the capture of an optical fiber. The dual diameter through holes 265 each have a principal symmetry axis 250 inclined at angle $\theta 1$. The inclination angle $\theta 1$ is measured in a plane normal to a plane containing the top surface of the alignment template plate. Holes 190, 110 and dual diameter through holes 265, may have smooth walls lined with a compliant polymer film 240 exhibiting a low coefficient of sliding friction. Examples of suitable low friction polymer coatings are, e.g., polytetrafluoroethylene or parylene. The polymer coating may be deposited conformally, e.g., by chemical vapor deposition. The deposition of parylene may be performed substantially at room temperature Polytetrafluoroethylene may be cured at temperatures substantially between 260° C. and 370° C. A thickness of the polymer coating may be selected from a range of, e.g., 0.25-0.75 microns, preferably 0.5 microns to provide a soft, slippery coating that facilitates the introduction of fibers without breakage.

The alignment template plate through holes may be defined by reactive ion etching. A suitable method for forming the dual diameter through holes in a silicon alignment template plate by reactive ion etching is described with reference to FIGS. 3A and 3B.

The alignment template plate additionally supports a passivation layer 220 (e.g., $Si_3N_5$, $SiO_2$, polyimide, etc.), spacer elements 295, (e.g., electroplated copper), an optically transparent layer 285, and a lens array 290. The lens array may be proximate the alignment template plate, e.g., proximate the bottom surface of the alignment template. In some embodiments, the lens array is aligned with holes 270 in precision alignment plate 210. By way of example, optically transparent layer 285 may be made of silicon, which is substantially transparent to light having a wavelength between 1 micrometer and 2 micrometers, or glass that is transparent to light over a broader range of wavelengths. Arrays of lenses manufactured on thin glass substrates are commonly used in mobile phone optical sensor arrays. Suitable lens materials are, e.g., glass or polymer. Lenses 290 may be made of a polymer material or glass material substantially transparent to light having a wavelength between 1 micrometer and 2 micrometers.

FIG. 2B is a top view of the parallelepiped alignment template plate structure of FIG. 2A. An array of three inclined holes is represented. Dashed line circle 212 represents the smaller, non-flared diameter, hole 270 at the bottom surface, circle 214 represents the larger non-flared diameter, hole 260 near and beneath the top surface. Circle 216 represents the flare diameter 280 at the upper surface. The center offset between the holes represented by the circles 212, 214, 216 corresponds to the offset attributable to tilt angle $\theta 1$ and thickness of the alignment template plate 210.

Alignment fiducials 230, 235 on the top and bottom surfaces of the fiber alignment template plate may be used to facilitate alignment during the assembly of support plate 162 with precision fiber alignment template plate 210.

Figures 3A, 3B:
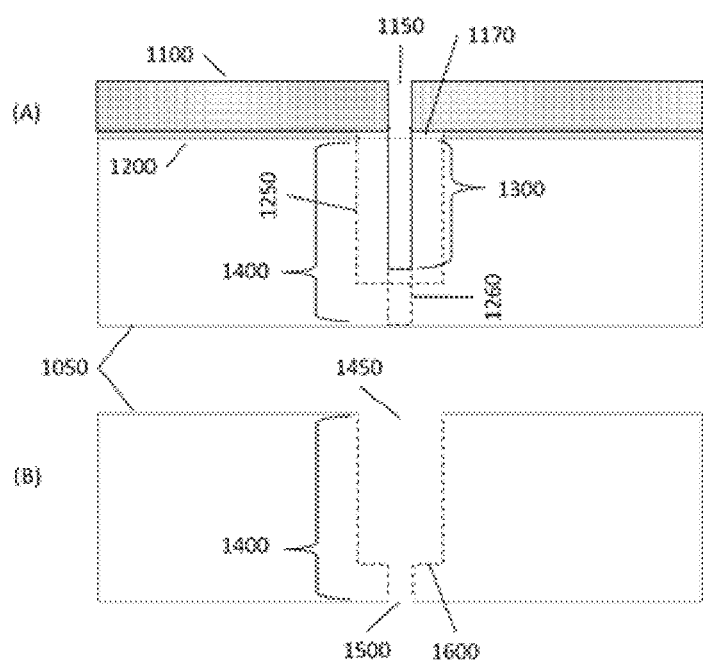
FIGS. 3A and 3B are cross-sectional views illustrating the formation of a dual diameter hole in silicon.

Referring now to FIG. 3A a dual mask process can be used to define, in a single etch step, a hole in, e.g., silicon having one diameter in a first part and a second diameter in a second part. See Chinese patent application "An Optical Communication Apparatus and a Method of Forming the Stopper Hole," CN201410375104.0, filed Jul. 31, 2014, incorporated herein by reference in its entirety. A first mask material 1200 is applied to a first substantially plane surface of the precision template plate material 1050 and a feature 1170 is opened in substantially thin mask 1200. A substantially thicker second mask material 1100 is then deposited and feature 1150 in mask 1100 is opened in substantial alignment with feature 1170. Open feature 1170 in mask 1200 is substantially larger than open feature 1150 in mask 1100. Mask materials 1200 and 1100 may, in addition, vary in composition. Intentional removal of template plate material at mask open features can be accomplished by plasma-enhanced chemical reactions, for example which is commonly referred to as "reactive ion etching" or "etching". Etching or removal of template plate material substantially beneath the mask-open areas continues until the template material is substantially pierced. Masking materials are generally chosen such that the rate at which template plate material is removed during etching is greater than the rate at which mask material is removed or consumed. The thickness and removal rate for each mask material is designed as follows: Hole 1150 is etched to depth 1300, at which point the mask material 1100 will be exhausted. Mask 1200 now provides for material removal over wider open feature 1170 while the remaining template plate material around 1050 now serves as the masking material which extends feature 1150 to completion. Feature 1170, being larger than feature 1150, etches faster than feature 1150, as is generally observed in chemical reactions that rely, in part, on the rate of transport of reactants. When template 1050 is substantially pierced to depth 1400 by hole 1150, feature 1170 will have etched to depth represented as 1250 and feature 1150 will have etched an additional depth represented as 1260.

After the removal of remaining mask material 1200, for example by a process generally referred to as "photoresist strip," the resulting dual diameter hole in template 1050 is represented in FIG. 3B as having opening 1450 at a first surface, opening 1500 at a second surface and an internal surface 1600. Surface 1600 is substantially parallel to the first surface of template plate 1050.

A flared opening may be made by a second etching process after completing the reactive ion etch hole formation. The second process may include wet etching or de-tuned dry etching. A method for forming a flared opening at a top surface of a hole in silicon post reactive ion etching by a wet etch method is disclosed by Panayotis Andricacos in U.S. Pat. No. 7,060,624 issued Jun. 13, 2006, incorporated herein by reference in its entirety.

The remainder of the figures describe the process of constructing the optical fiber assembly in accordance with embodiments of the invention.

Figure 4:
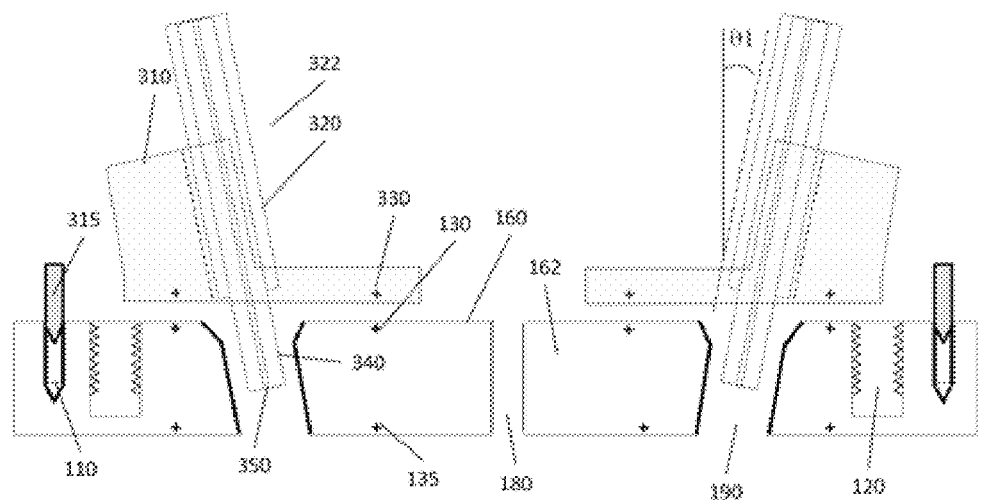
FIG. 4 is a cross-sectional view depicting a first stage alignment in which V-blocks hosting arrays of inclined optical fibers are aligned to receiving inclined through holes in the support plate in accordance with an embodiment of the invention.

FIG. 4 depicts support plate 162 into which pins 315, attached to mounting block 310, have been inserted to provide preliminary alignment. Alignment blocks 310 are pre-loaded with an array of optical fibers 322, each optical fiber having a buffer coating 320, cladding 340, and core 350. The optical fiber array 322 may, by way of example, be temporarily held in a planar array such that the principal plane of the array is inclined at angle θ1 with respect to surface 160 of support plate 162. Fiducials 130 on top surface 160 of the support plate 162 are aligned with fiducials 330 on the bottom surface of alignment block 310. Fiducials serve to align optical fiber arrays 322 with the array of through holes 190 prior to insertion. Optical fibers are inserted as arrays. Preferably, the optical fiber array is held firmly but loosely held in place in alignment blocks 310 during fiducial alignment.

Figures 5A, 5B:
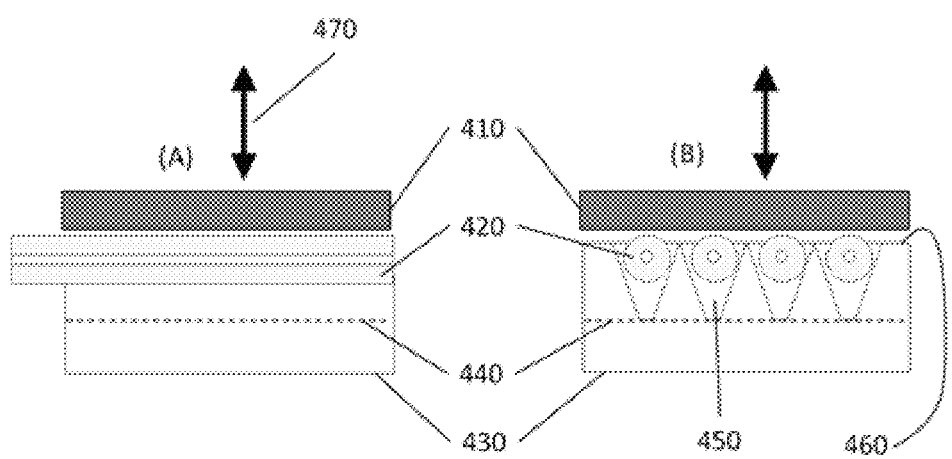
FIGS. 5A and 5B are cross-sectional and end views, respectively, of a V-block hosting optical fibers having a lid subject to variable pressure in accordance with an embodiment of the invention.

The optical fiber array is temporarily held in alignment blocks 310 by V-groove channels, as depicted in FIGS. 5A and 5B, inclined at angle θ1. As seen in side view of FIGS. 5A and in end view of FIG. 5B, V-block 430 may include, by way of example, an array of parallel channels 450 having a depth 440 and sloped walls that contact optical fibers in array 420 along two substantially parallel contact lines. The depth 440 of V-grooves depends on the V-groove angle and the condition that the optical fiber cladding protrude slightly above the surface 460 of the V-block 430 and contacts pressure plate 410 when retaining pressure is applied to the fiber array. In the embodiment illustrated in FIGS. 5A and 5B, optical fibers extend above surface 460 of V-block 430. Top "compress-and-release" plate 410 is pressed slightly by an actuator 470 to hold the fiber array in place during alignment and pressed more lightly to allow the fiber array to slide under the action of a small force and execute a controlled slide of the fiber array 420 into the matching array of through holes 190.

Figure 6:
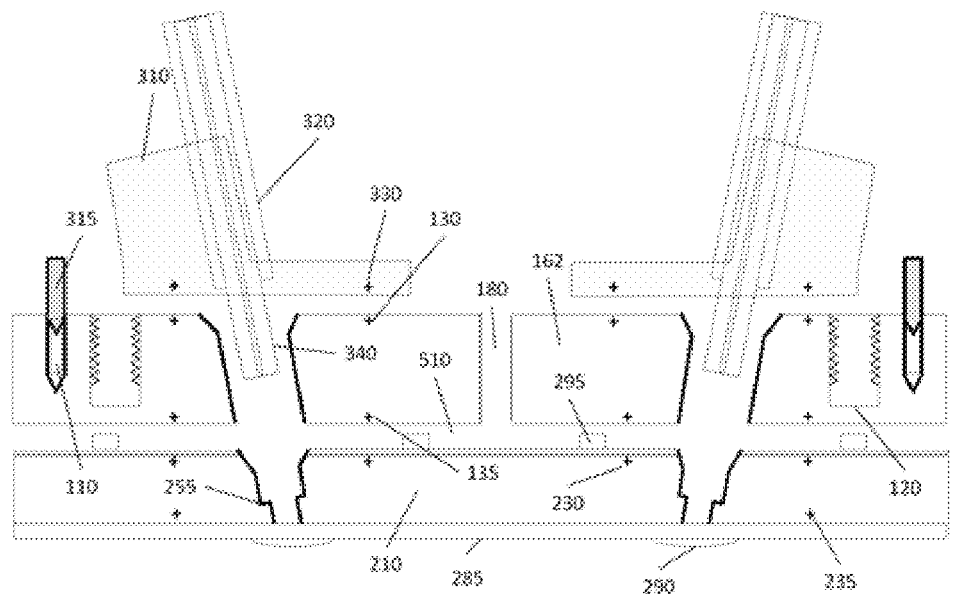
FIG. 6 is a cross-sectional view depicting a second stage alignment of a V-block with a template plate in accordance with an embodiment of the invention.

As an example of a procedure for assembling arrays of optical fibers into the precision template plate, a V-block 310 is first loaded with a plurality of optical fibers. The V-block is then aligned to the top surface of support plate 162 by use of fiducials. The alignment template plate 210 is placed on a low mass and substantially frictionless air cushion (e.g., an air bearing stage) or an air sliding stage and aligned with the bottom surface of the support block 162, as depicted in FIG. 6. V-block 310, support plate 162, and precision fiber alignment template plate 210 are then firmly contacted. The spacers 295 provide a cavity 510 between support plate 162 and precision fiber alignment template plate 210. Pressure on top compress-and-release plate 410 is eased to allow controlled slide of optical fiber sequentially or simultaneously into through holes 190 and 265. Flared openings 170, 280 in the inclined through holes 190, 265 (whose walls are preferably polymer coated) aid the guiding of optical fiber arrays during insertion. Support plate through holes 190 are made somewhat larger than the fiber diameter to aid in fiber insertion. To ensure good alignment, the diameters of alignment template plate through holes 265 are preferably only slight larger than the diameters of the optical fibers. During optical fiber insertion into the through holes in the alignment template plate, the flared opening captures the fiber and guides it to the narrower diameter. The flexibility of the fiber provides a small degree of compliance over a short distance. The frictionless and free sliding movement of the air bearing stage provides minimum average shear force in response to the net shear force exerted by the whole of the fiber array.

Figure 7:
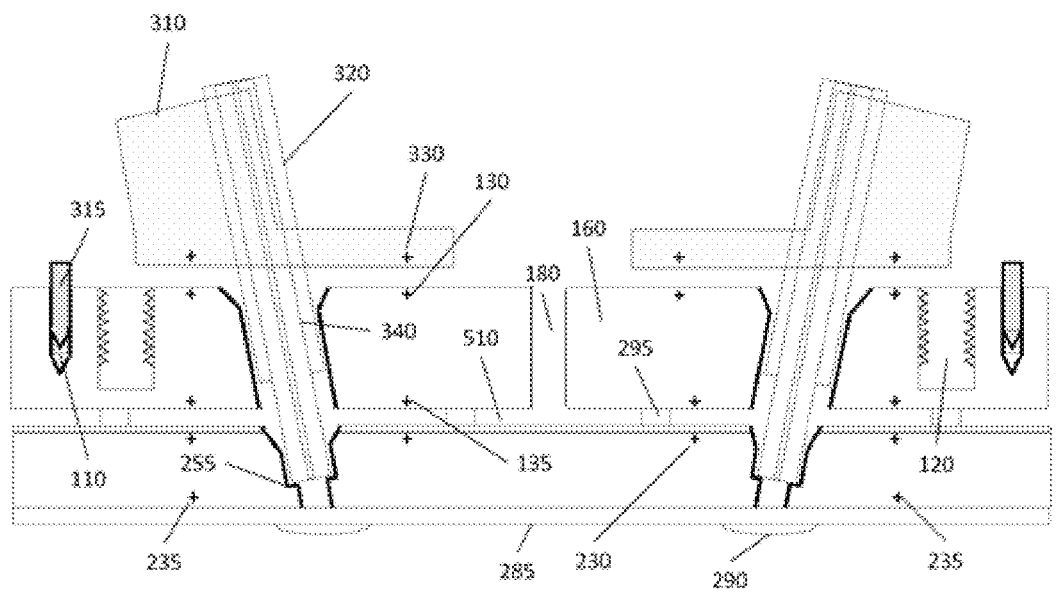
FIG. 7 is a cross-sectional view depicting a third stage alignment during which aligned components establish contact and optical fibers are slid into inclined holes in accordance with an embodiment of the invention.

Referring to FIG. 7, sensors, not shown, may be used to sense when the end of the optical fiber contacts the narrow diameter at point 255.

Figure 8:
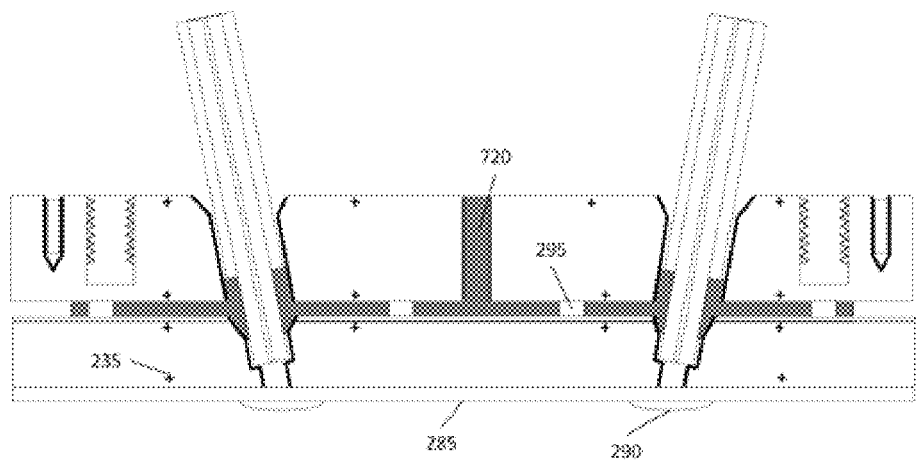
FIG. 8 is a cross-sectional view depicting a bonding agent being introduced and set into provided spaces in accordance with an embodiment of the invention.

Upon completion of fiber insertion, a substantially liquid binding agent 720, having low viscosity and commonly used in chip flow underfills, e.g., Loctite 3536, may be introduced through cavities 180 and 510 and allowed to set, thereby forming a unit fiber assembly block as shown in FIG. 8.

Figure 9:
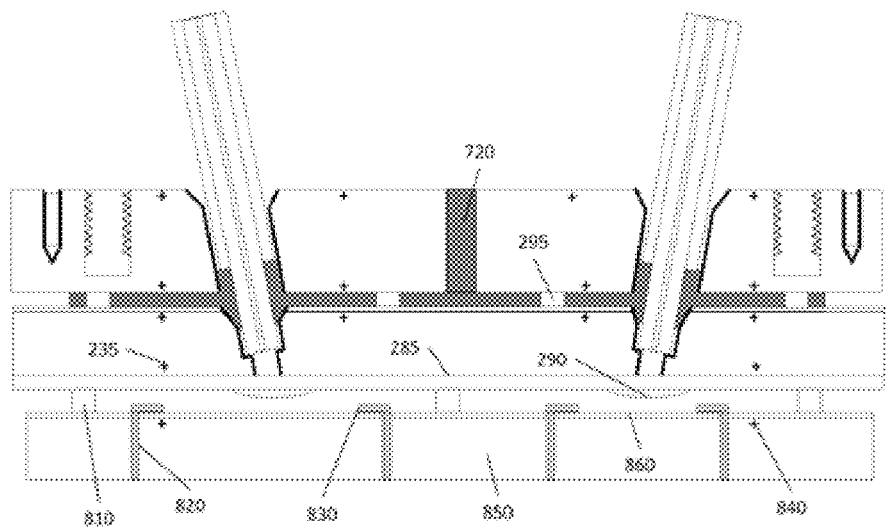
FIG. 9 is a cross-sectional view depicting post alignment and bonding of photonic die to an alignment template plate in accordance with an embodiment of the invention.

Referring to FIG. 9, an optical photonic circuit device 850 may be attached to the fiber assembly. Spacers 810 provide optical path distance necessary to obtain the design optical beam diameter on the grating beam mode transformer used to couple light in and out of the photonic circuit. Alignment fiducials 840 and 235 provide guidance for alignment. Buffer layer 860 may provide electrical isolation for electrical lines 820, 830.

Figure 10:
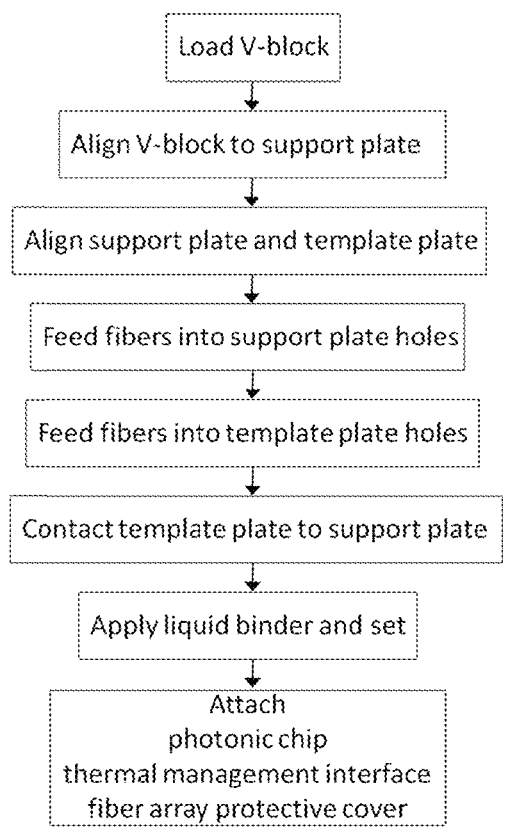
FIG. 10 is a flow chart summarizing a sequence of steps leading to the completion of the optical fiber assembly in accordance with an embodiment of the invention.

Referring to FIG. 10, a summary of the assembly procedures is as follows:

1. Load fibers onto a plurality of V-blocks and apply pressure to fiber array retaining plate.
2. Align V-block fiducials with fiducials on the top surface of the support plate.
3. Place alignment template plate onto air bearing stage.
4. Align template plate top fiducials with fiducials on the bottom surface of the support plate.
5. Decrease pressure on the fiber array retaining plate to allow sliding of optical fibers under the application of array feed force.
6. Feed fibers into tilted and flared support plate through holes.
7. Continue to feed fiber array into tilted and flared through holes in alignment template plate that is free to slide substantially frictionlessly, thus adjusting to minimize net shear force.
8. Stop when fiber array contacts smaller diameter through hole in the alignment template plate.
9. Contact alignment template plate to support plate.
10. Increase pressure on fiber retaining plate to hold fibers in place.
11. Apply liquid binder through dispensing channels and cure.
12. Decrease pressure on fiber retaining plate and remove mounting V-blocks.
13. Attach photonic chip.
14. Attach thermal management interface.

15. Attach fiber array protective cover.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. An optical fiber assembly comprising:
a support plate comprising a first planar element defining an array of support plate through holes, each support plate through hole having a constant diameter and ending at a top surface of the support plate, wherein each support plate through hole has a principal symmetry axis defining an oblique angle with the top surface of the support plate; and
an alignment template plate disposed parallel to the support plate with a top surface of the alignment template plate opposing a bottom surface of the support plate, the alignment template plate comprising a second planar element defining an array of alignment template plate through holes, each alignment template plate through hole having dual diameters and ending at a top surface of the alignment template plate,
wherein (i) each alignment template plate through hole has a symmetry axis defining an oblique angle with the top surface of the alignment template, (ii) the array of alignment template plate through holes is aligned with the array of support plate through holes such that the symmetry axis of each alignment template plate through hole coincides with the symmetry axis of a respective support plate through hole, and (iii) at least one support plate through hole or at least one alignment template through hole is flared outwards.

2. The optical fiber assembly of claim 1, wherein at least one support plate through hole is flared outwards at the top surface of the support plate.

3. The optical fiber assembly of claim 1, wherein at least one alignment template plate through hole is flared outwards at the top surface of the alignment template plate.

4. The optical fiber assembly of claim 1, wherein at least one template plate through hole comprises dual concentric diameters.

5. The optical fiber assembly of claim 1, wherein the bottom surface of the support plate is parallel to the top surface of the alignment template plate.

6. The optical fiber assembly of claim 1, further comprising spacers disposed between the support plate and the alignment template plate.

7. The optical fiber assembly of claim 6, wherein the spacers comprise an insulating material.

8. The optical fiber assembly of claim 1, further comprising an array of parallel optical fibers extending through the support plate through holes and stopping inside the alignment template plate through holes, each optical fiber having a longitudinal axis parallel to a respective support plate through hole array symmetry axis and alignment plate through hole array symmetry axis.

9. The optical fiber assembly of claim 8, wherein at least one template plate through hole comprises dual concentric diameters and at least one optical fiber terminates at a smaller concentric diameter of the at least one template through hole.

10. The optical fiber assembly of claim 1, further comprising a lens array.

11. The optical fiber assembly of claim 10, wherein the lens array is proximate a bottom surface of the alignment template plate.

12. The optical fiber assembly of claim 10, wherein the lens array is aligned with respect to the array of alignment template plate through holes.

13. The optical fiber assembly of claim 1, further comprising a compliant film disposed on a wall of at least one support plate through hole.

14. The optical fiber assembly of claim 1, further comprising a compliant film disposed on a wall of at least one alignment template plate through hole.

15. The optical fiber assembly of claim 1, further comprising a polymer disposed between the support plate and the alignment template plate.

16. The optical fiber assembly of claim 1, wherein the bottom surface of the support plate is substantially parallel to the top surface of the alignment template plate.

17. An optical fiber assembly comprising:
a support plate comprising a first planar element defining an array of support plate through holes, each support plate through hole having a constant diameter and ending at a top surface of the support plate, wherein each support through hole has a principal symmetry axis defining an oblique angle with the top surface of the support plate; and
an alignment template plate disposed parallel to the support plate with a top surface of the alignment template plate opposing a bottom surface of the support plate, the alignment template plate comprising a second planar element defining an array of alignment template plate through holes, each alignment template plate through hole having dual diameters and ending at a top surface of the alignment template plate,
wherein (i) each alignment template plate through hole has a symmetry axis defining an oblique angle with the top surface of the alignment template, (ii) the array of alignment template plate through holes is aligned with the array of support plate through holes such that the symmetry axis of each alignment template plate through hole coincides with the symmetry axis of a respective support plate through hole, and (iii) a compliant film is disposed on at least one support plate through hole and at least one alignment template plate through hole.

18. A method for assembling an optical fiber assembly, the method comprising the steps of:
a) providing a support plate defining an array of tilted and flared support plate through holes;
b) aligning an alignment template plate top surface with a bottom surface of the support plate, the alignment template plate defining an array of tilted and flared alignment template through holes, wherein at least one support plate through hole or alignment template through hole comprises a compliant film; and
c) inserting a plurality of optical fibers into the arrays of support plate through holes and alignment template plate through holes.

* * * * *